United States Patent [19]

Riew

[11] 4,120,766

[45] Oct. 17, 1978

[54] HYDROXYL-CONTAINING LIQUID POLYMERS AND PROCESS FOR PREPARATION THEREOF

[75] Inventor: Changkiu Keith Riew, Akron, Ohio

[73] Assignee: The B. F. Goodrich Company, Akron, Ohio

[21] Appl. No.: 782,104

[22] Filed: Mar. 28, 1977

[51] Int. Cl.² .............................................. B01J 1/10
[52] U.S. Cl. ............................................... 204/158 R
[58] Field of Search ................................... 204/158 R

[56] References Cited

U.S. PATENT DOCUMENTS 3,470,146  9/1969  Maclay ................................. 260/93.5

*Primary Examiner*—Howard S. Williams
*Attorney, Agent, or Firm*—Charles A. Crehore

[57] ABSTRACT

Hydroxyl-containing liquid polymers having an aliphatic polymeric backbone and sulfide linkages near the terminal portions of the polymer molecule are prepared by polymerizing (1) at least one of selected vinylidene monomers having at least one terminal $CH_2=C<$ group per monomer molecule, together with (2) at least one hydroxyl-containing disulfide in the presence of (3) ultraviolet radiation.

12 Claims, No Drawings

HYDROXYL-CONTAINING LIQUID POLYMERS AND PROCESS FOR PREPARATION THEREOF

BACKGROUND OF THE INVENTION

Thermal polymerization of styrene is known using a disulfide modifier in the presence of azoisobutyronitrile initiator (Pierson et al, 17 *J. Polymer Science* 221–246, 1955). Alkyl disulfides were found in the latter reference to be relatively ineffective compared to aryl disulfides in incorporating end groups into polystyrene. U.S. Pat. No. 3,470,146 discloses improved polystyrene beads produced by thermal polymerization of styrene in the presence of a finely divided phosphate suspending agent, a water soluble sulfite or precursor, and certain water soluble organic sulfides. None of the above references discloses liquid polymers or a process for preparing them, let alone hydroxyl-containing liquid polymers having an aliphatic polymeric backbone and sulfide linkages near the terminal portions of the polymer molecule, and the use of ultraviolet radiation to prepare the polymers. Such new hydroxyl-containing liquid polymers and a process for preparing them are desired.

SUMMARY OF THE INVENTION

Hydroxyl-containing liquid polymers are prepared having the formula

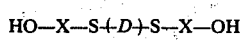

wherein S is a sulfide linkage; X is $(CH_2O)_m(CH_2)_n$ or

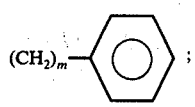

$m$ is an integer from 0 to 10; $n$ is an integer from 1 to 10; and D is an aliphatic backbone containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms; (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

said R being hydrogen or an alkyl radical containing 1 to 3 carbon atoms, and said $R^1$ being hydrogen, an alkyl or hydroxyalkyl radical containing 1 to 18 carbon atoms, or an alkoxyalkyl, alkylthioalkyl or cyanoalkyl radical containing 2 to 12 carbon atoms. The hydroxyl-containing liquid polymers are prepared by polymerizing said monomer(s) together with at least one hydroxyl-containing disulfide in the presence of ultraviolet radiation. The disulfide has the formula

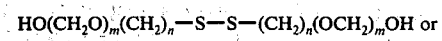
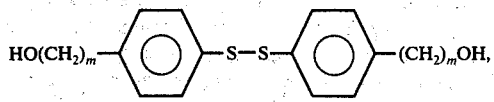

wherein $m$ is an integer from 0 to 10, and $n$ is an integer from 1 to 10.

DETAILED DESCRIPTION

By the process of this invention, hydroxyl-containing liquid polymers can be produced having an aliphatic polymeric backbone and sulfide linkages near the terminal portions of the polymeric molecule. The hydroxyl-containing liquid polymers of this invention have the formula

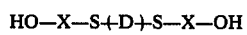

wherein S is a sulfide linkage; X is $(CH_2O)_m(CH_2)_n$ or

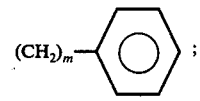

$m$ is an integer from 0 to 10, more preferably 0 to 4; and $n$ is an integer from 1 to 10, more preferably 1 to 4. Excellent results were obtained when $m$ was 0 and $n$ was 2. D is an aliphatic backbone containing polymerized units of at least one of certain vinylidene monomers having at least one terminal $CH_2=C<$ group per monomer molecule. The aliphatic polymeric backbone D comprises carbon-carbon linkages totaling at least about 95% by weight of total polymeric backbone weight, more preferably about 100% by weight of total polymeric backbone weight.

The hydroxyl-containing liquid polymers contain an average from about 1.1 to about 4 hydroxyl groups per molecule, more preferably from about 1.5 to about 2.5 hydroxyl groups per molecule. Average functionalities lower than 2 are accounted for by the fact that not all polymer chain ends need be terminated by hydroxyl groups. Average functionalities higher than 2 are explained by the fact that some hydroxyl groups may be pendant from the polymeric backbone, e.g., when a hydroxyl-containing comonomer such as 2-hydroxyethyl acrylate or vinyl benzyl alcohol is used. Alternatively, a carboxylated comonomer such as acrylic acid may be used, and after polymerization is complete, some or all of the carboxyl groups may be reacted with ethylene oxide, butanediol or the like to produce hydroxyl groups. Such pendant hydroxyl groups giving average functionalities higher than 2 may be useful where higher crosslink density is desired from a subsequent crosslinking reaction, e.g., using polyisocyanates or the like.

The hydroxyl-containing liquid polymers may have Brookfield viscosities (measured using a Brookfield RVT viscometer at 27° C.) from about 500 cps. to about 2,500,000 cps., more preferably from about 500 cps. to about 1,200,000 cps. The hydroxyl-containing liquid polymers may have hydroxyl equivalent weights (gram molecular weight per hydroxyl group) from about 200 to about 10,000, more preferably from about 400 to about 5,000.

The hydroxyl-containing liquid polymers can be produced by reacting at least one of selected vinylidene monomers with at least one hydroxyl-containing disulfide in the presence of ultraviolet radiation. The vinylidene monomer contains at least one terminal $CH_2=C<$ group and is selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

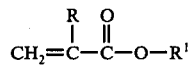

wherein R is hydrogen or an alkyl or hydroxyalkyl radical containing 1 to 3 carbon atoms, and $R^1$ is hydrogen or an alkyl or hydroxyalkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl or hydroxyalkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, 2-hydroxyethyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone.

More preferred liquid polymers contain polymerized units of at least one vinylidene monomer having at least one terminal $CH_2=C<$ group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

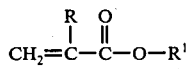

wherein R is hydrogen or an alkyl or hydroxyalkyl radical containing 1 to 3 carbon atoms, and $R^1$ is hydrogen or an alkyl or hydroxyalkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl or hydroxyalkyl radical containing 1 to 8 carbon atoms. Excellent results were obtained with dienes containing 4 to 10 carbon atoms, more preferably 4 to 8 carbon atoms, including butadiene. Excellent results were also obtained with alkyl and hydroxyalkyl acrylates wherein the alkyl or hydroxyalkyl group contained 1 to 8 carbon atoms, including ethyl acrylate, 2-hydroxyethyl acrylate, and butyl acrylate.

The vinylidene monomers described above may be polymerized readily with from 0% to about 40% by weight, more preferably from 0% to about 25% by weight, of at least one copolymerizable ethylenic monomer. Suitable comonomers include those selected from the group consisting of (f) vinyl aromatics having the formula

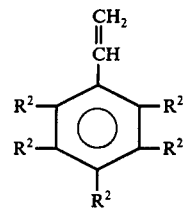

wherein $R^2$ is hydrogen, halogen or an alkyl or hydroxyalkyl radical containing 1 to 4 carbon atoms, such as styrene, α-methyl styrene, chlorostyrene, vinyl toluene, vinyl benzyl alcohol, and the like; (g) vinyl nitriles having the formula

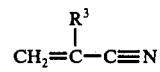

wherein $R^3$ is hydrogen or an alkyl radical containing 1 to 3 carbon atoms, such as acrylonitrile, methacrylonitrile and the like; (h) divinyls and diacrylates such as divinyl benzene, divinyl ether, diethylene glycol diacrylate, and the like; (i) amides of α,β-olefinically unsaturated carboxylic acids containing 2 to 8 carbon atoms such as acrylamide and the like; and (j) allyl alcohol and the like. Liquid polymer compositions comprising polymerized units of a major amount of at least one vinylidene monomer listed in (a) to (e) with a minor amount of at least one comonomer listed in (f) to (j) are within the scope of this invention.

More preferred comonomers may be selected from the group consisting of (f) vinyl aromatics having the formula

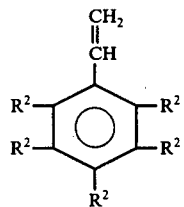

wherein $R^2$ is hydrogen, halogen or an alkyl or hydroxyalkyl radical containing 1 to 4 carbon atoms; and (g) nitriles having the formula

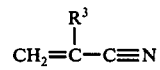

wherein $R^3$ is hydrogen or an alkyl radical containing 1 to 3 carbon atoms. Excellent results were obtained using acrylonitrile.

Examples of useful liquid polymeric backbones comprising carbon-carbon linkages include polyethylene, polyisobutylene, polyisoprene, polybutadiene, poly(vinyl ethyl ether), poly(ethylacrylate) and poly(butylacrylate) as well as copolymers of butadiene and acrylonitrile; butadiene and styrene; butadiene, butyl acrylate and acrylonitrile; vinyl acetate and isoprene; vinyl ethyl ether and diallyl ether; vinyl ethyl ether and α-methyl styrene; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and butyl acrylate; ethyl acrylate and vinyl acetate; ethyl acrylate and styrene; ethyl acrylate, styrene and butadiene; ethyl acrylate and n-butyl acrylate; ethyl acrylate, n-butyl acrylate, and 2-ethylhexyl acrylate; ethyl acrylate and 2-ethylhexyl acrylate; ethyl acrylate and acrylic acid; ethyl acrylate and acrylamide; ethyl acrylate and allyl alcohol; butyl acrylate, styrene and isoprene; butyl acrylate and 2-hydroxyethyl acrylate; butyl acrylate, ethyl acrylate, and 2-hydroxyethyl acrylate; butyl acrylate and styrene; butyl acrylate, ethyl acrylate and acrylonitrile; butyl acrylate and vinyl benzyl alcohol; and the like. Excellent results were obtained in producing a backbone comprising copolymerized linkages of butadiene and acrylonitrile; ethyl acrylate and butyl acrylate; butyl acrylate and 2-hydroxyethyl acrylate; and butyl acrylate, butadiene and acrylic acid, wherein following polymerization the acrylic acid backbone units were reacted further with ethylene oxide to introduce further hydroxyl groups into the polymer molecule.

Hydroxyl-containing disulfides suitable for use in the process of this invention have the formula $$HO(CH_2O)_m(CH_2)_n-S-S-(CH_2)_n(OCH_2)_mOH \text{ or}$$

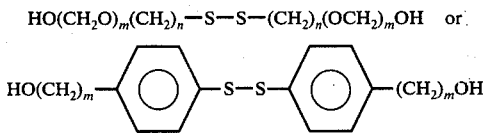

wherein $m$ is an integer from 0 to 10, more preferably from 0 to 4, and $n$ is an integer from 1 to 10, more preferably from 1 to 4. Examples of suitable hydroxyl-containing disulfides include 2-hydroxyethyl disulfide, 3-hydroxypropyl disulfide and the like. Excellent results were obtained using 2-hydroxyethyl disulfide. The disulfide acts both as a polymerization initiator and also as a polymerization modifier. The amount of hydroxyl-containing disulfide will vary according to the desired polymeric molecular weight but typically is from about 1 to 20 weight percent, more preferably from 1 to 10 weight percent, based upon total monomeric weight.

At least one vinylidene monomer defined heretofore is reacted together with at least one hydroxyl-containing disulfide in the presence of ultraviolet (UV) radiation having a wavelength from about 1,850 Å to about 6,000 Å, more preferably from about 2,400 Å to about 4,000 Å. Common sources of UV radiation include mercury lamps and arcs, carbon arcs and hydrogen discharge tubes. The vessel in which the polymerization is conducted may be transparent to light of the desired wavelength, with the UV light source located external to the vessel so that light can pass through the sides of the vessel. Suitable glasses are available commercially and include borosilicates ("Pyrex"), "Vycor" or soft glass. Alternatively, the UV light source may be placed within the reaction vessel, either directly above the surface of the reaction mixture or within the mass of the reaction mixture. In some cases a sensitizer may be useful in catalytic amounts to accelerate the photopolymerization, including ketones such as acetone, benzophenone and the like.

The photopolymerization may be conducted by any method known to the art, including bulk, solution, suspension and emulsion methods. Solvents for the monomer and/or polymer can be used during polymerization, including benzene, aliphatic hydrocarbons such as hexane and heptane, and alcohols such as methanol, ethanol, t-butanol and the like. Well-known suspension techniques comprise suspending the monomeric material, preferably already mixed with the hydroxyl-containing disulfide, in the form of small particles in a non-solvent liquid such as water, together with a suspending agent to aid in maintaining the particles separate from one another during polymerization. Suitable suspending agents include starch, carboxymethylcellulose and the like. Emulsion polymerization is similar, except that emulsifiers are used to produce much smaller particles, and the end product is a stable aqueous emulsion of the polymer. Suitable emulsifiers include sodium or potassium fatty acid soaps, sodium alkaryl sulfonates, and the like.

Air or oxygen has an inhibiting effect on the reaction and preferably is excluded from the reaction vessel. Therefore, the reaction vessel desirably is flushed with nitrogen before the vessel is charged, and a nitrogen purge may be continued if necessary to exclude air during polymerization. The reaction generally is conducted with stirring at room temperature, with cooling provided if necessary. The polymerization rate may be monitored by withdrawing reaction mixture samples at periodic intervals for total solids analysis. The reaction can be run to 100% conversion, but it generally is more economical to run to about 70–90% conversion and recover unreacted monomer for reuse. The hydroxyl-containing liquid polymer may be purified by vacuum distillation or by washing with a solvent such as a benzene-methanol mixture in order to remove the unreacted hydroxyl-containing disulfide, followed by drying the polymer. The structure of the hydroxyl-containing liquid polymer can be confirmed by infrared analysis, together with well-known wet chemical methods for determination of hydroxyl and sulfur content. Number average molecular weights ($M_{\bar{n}}$) can be measured using vapor pressure osmometry, gel permeation chromatography or the like.

The following examples illustrate the present invention more fully.

EXAMPLES

The following examples demonstrate preparation of hydroxyl-containing liquid polymers having aliphatic carbon-carbon backbone linkages, together with sulfide linkages near the terminal portions of the polymeric molecule. Brookfield viscosity, employing an LVT model viscometer and a #4 spindle, was run at 27° C. on the freshly prepared polymers. Polymeric number average molecular weights ($M_{\bar{n}}$) were measured using vapor pressure osmometry and toluene as the solvent. The instrument was calibrated using azobenzene or biphenyl. Weight percent hydroxyl and weight percent sulfur were measured by wet chemical analysis.

Hydroxyl functionality (Functionality $_{OH}$) was calculated as follows:

$$\text{Functionality}_{OH} = \frac{(\text{Ephr}_{OH}) \times (M_{\bar{n}})}{100}$$

where $$\text{Ephr}_{OH} = \frac{\text{wt.\% hydroxyl content.}}{17}$$

Sulfide functionality (Functionality$_S$) was calculated as follows:

may be explained at least in part by the fact that different wet chemical analytical techniques were used. Test results are summarized in Table I.

TABLE I

| Example | 1 | 2 | 3 | 4 | 5 |
|---|---|---|---|---|---|
| Polymerization Recipe | | | | | |
| Butadiene, grams | 160 | 160 | 160 | 170 | 170 |
| Acrylonitrile, grams | 40 | 40 | 40 | 30 | 30 |
| 2-Hydroxyethyl Disulfide, grams | 12 | 8 | 4 | 8 | 12 |
| t-Butanol, grams | 24 | 16 | 8 | 32 | 48 |
| % Conversion after | | | | | |
| 24 hours | 23 | 21 | 15 | 15 | 17 |
| 48 hours | 42 | 34 | 24 | 40 | 54 |
| 69 hours | 55 | 45 | 31 | — | — |
| 96 hours | 65 | 52 | 34 | — | — |
| 195 hours | — | — | — | — | — |
| Polymer Test Data | | | | | |
| Brookfield viscosity at 27° C., cps | 75,000 | 106,000 | 220,000 | 35,000 | 19,300 |
| $M_n$ | 1,410 | 1,636 | — | 1,409 | 1,140 |
| Wt.% Hydroxyl Content | 1.52 | 1.16 | 0.92 | 1.70 | 2.00 |
| Ephr$_{OH}$ | 0.0894 | 0.0682 | 0.0541 | 0.100 | 0.118 |
| Hydroxyl Equivalent Weight | 1,119 | 1,466 | 1,848 | 1,000 | 847 |
| Functionality$_{OH}$ | 1.3 | 1.1 | — | 1.4 | 1.4 |
| Wt.% Sulfur Content | 3.52 | 2.57 | 2.64 | 3.66 | 4.58 |
| Ephr$_S$ | 0.110 | 0.080 | 0.083 | 0.114 | 0.143 |
| Functionality$_S$ | 1.6 | 1.3 | — | 1.6 | 1.6 |

$$\text{Functionality}_S = \frac{(\text{Ephr}_S) \times (M_{\bar{n}})}{100}$$

where $$\text{Ephr}_S = \frac{\text{wt.\% sulfur content}}{32}$$

EXAMPLES 1–5

In each of examples 1 to 5, butadiene, acrylonitrile, 2-hydroxyethyl disulfide and t-butanol solvent were charged to a clean, 16oz. pop bottle reactor which had been flushed with nitrogen and equipped with a magnetic bar stirrer. The bottle was capped with a three-hole metal cap having a neoprene rubber liner and placed on a magnetic stirrer. An ultraviolet radiation source (GE "Circline" fluorescent lamp equipped with a "Black-lite" #FC 12T10-BL bulb) was placed next to the bottle and turned on, and stirring was begun. It was found that when the UV lamp was turned off, polymerization ceased until the lamp was turned back on. Total reaction time and % conversion for each of examples 1 to 5 is set forth in Table I.

After a given reaction time the reactor was cooled, and unreacted monomer was vented through a syringe needle inserted through a cap hole. Venting was continued until bubbling ceased in the reactor. The metal cap was removed and the reaction mixture transferred to a round-bottomed flask. The flask was connected to a rotary evaporator, which was used to remove solvent and residual unreacted monomer. The reaction products were analyzed using the test methods described heretofore. In each of examples 1–5, sulfur functionality was somewhat higher than hydroxyl functionality. This

EXAMPLES 6–13

In each of examples 6–9 and 11–13, n-butyl acrylate, ethyl acrylate, 2-hydroxyethyl disulfide and t-butanol solvent (where used) were charged to a clean 16oz. pop bottle reactor which had been flushed with nitrogen and equipped with a magnetic bar stirrer. The bottle was capped as in the previous examples and placed on a magnetic stirring plate. In example 10 a flask and pneumatic stirrer was used, with the flask being sealed after purging and charging was complete. An ultraviolet radiation source (GE "Circline" fluorescent lamp equipped with a "Black-Lite" #FC 12T10-BL bulb) was placed next to the bottle and turned on, and stirring was begun. After the time listed in Table II for each example, each polymer was recovered as described in the previous examples. The polymers were all clear and colorless. Polymerization data is summarized in Table II.

TABLE II

| Example | 6 | 7 | 8 | 9 | 10 | 11 | 12 | 13 |
|---|---|---|---|---|---|---|---|---|
| uz,1/11 Polymerization Recipe | | | | | | | | |
| n-Butyl Acrylate, grams | 70 | 730 | 70 | 70 | 280 | 140 | 140 | 140 |
| Ethyl Acrylate, grams | 30 | 30 | 30 | 30 | 120 | 60 | 60 | 60 |
| 2-Hydroxyethyl Disulfide, grams | 6 | 2+ | 4 | 2 | 24 | 8 | 20 | 16 |
| t-Butanol, grams | — | — | — | — | 30 | 8 | 20 | 50 |
| Number of UV Lamps Used | 2 | 2 | 2 | 2 | 2 | 1 | 1 | 1 |
| Total Polymerization Time, hours | 1.0 | 1.0 | 1.0 | 1.0 | 2.0 | 5.0 | 6.0 | 6.0 |
| % Conversion | 50.6 | 65.5 | 54.2 | 44.6 | 75.2 | 56.1 | 57.8 | 45.6 |

+One gram 2-hydroxyethyl disulfide was charged together with other reactants, and the second gram was charged 30 minutes after polymerization began.

The hydroxyl-containing liquid polymers of this invention are useful as rocket propellant binders, adhesives, sealants, caulking compounds, polyurethane prepolymers, and the like.

I claim:
1. A process for preparing a hydroxyl-containing liquid polymer containing an average from 1.1 to 4 hydroxyl groups per molecule, said polymer having an aliphatic backbone containing carbon-carbon linkages comprising at least 95% of total polymeric backbone weight, said process comprising polymerizing
  (1) at least one vinylidene monomer having at least one terminal $CH_2\!\!=\!\!C<$ group, together with

(2) at least one hydroxyl-containing disulfide having the formula

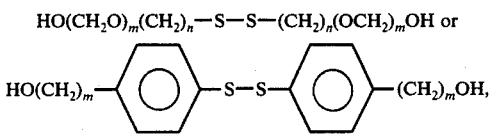

wherein $m$ is an integer from 0 to 10, and $n$ is an integer from 1 to 10,
(3) the polymerization being conducted in the presence of ultraviolet radiation having a wavelength from about 1,850 Å to about 6,000 Å, wherein
(4) said vinylidene monomer is selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

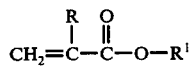

said R being hydrogen or an alkyl or hydroxyalkyl radical containing 1 to 3 carbon atoms, and said $R^1$ being hydrogen, an alkyl or hydroxyalkyl radical containing 1 to 18 carbon atoms, or an alkoxyalkyl, alkylthioalkyl, or cyanoalkyl radical containing 2 to 12 carbon atoms.

2. A process of claim 1 wherein said carbon-carbon linkages comprise 100% by weight of total polymeric backbone weight, and said monomer is selected from the group consisting of (a) monoolefins containing 2 to 8 carbon atoms, (b) dienes containing 4 to 8 carbon atoms, and (e) acrylic acids and acrylates having the formula

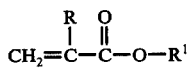

said R being hydrogen or an alkyl or hydroxyalkyl radical containing 1 to 3 carbon atoms, and said $R^1$ being hydrogen, an alkyl or hydroxyalkyl radical containing 1 to 8 carbon atoms, or an alkoxyalkyl, alkylthioalkyl or cyanoalkyl radical containing 2 to 8 carbon atoms.

3. A process of claim 2 wherein said hydroxylcontaining disulfide has the formula

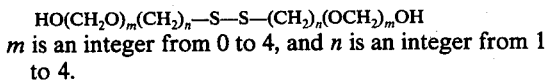

$m$ is an integer from 0 to 4, and $n$ is an integer from 1 to 4.

4. A process of claim 3 wherein said vinylidene monomer has copolymerized therewith from 0 to about 40% by weight of at least one copolymerizable ethylenic monomer.

5. A process of claim 4 wherein said copolymerizable ethylenic monomer is selected from the group consisting of (f) vinyl aromatics having the formula

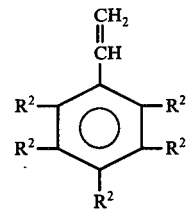

wherein $R^2$ is hydrogen, halogen or an alkyl or hydroxyalkyl radical containing 1 to 4 carbon atoms, (g) vinyl nitriles having the formula

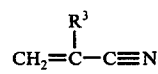

wherein $R^3$ is hydrogen or an alkyl radical containing 1 to 3 carbon atoms, (h) divinyls and diacrylates, (i) amides of α,β-olefinically unsaturated carboxylic acids containing 2 to 8 carbon atoms, and (j) allyl alcohol.

6. A process of claim 5 wherein said vinylidene monomer is at least one of butadiene, butyl acrylate, ethyl acrylate, and 2-hydroxyethyl acrylate.

7. A process of claim 6 wherein said vinylidene monomers are butyl acrylate and ethyl acrylate, and said hydroxyl-containing disulfide is 2-hydroxyethyl disulfide.

8. A process of claim 6 wherein said vinylidene monomers are butyl acrylate and 2-hydroxyethyl acrylate, and said hydroxyl-containing disulfide is 2-hydroxyethyl disulfide.

9. A process of claim 6 wherein said vinylidene monomer is butadiene, said comonomer is acrylonitrile, and said hydroxyl-containing disulfide is 2-hydroxyethyl disulfide.

10. A process of claim 6 wherein said vinylidene monomers are butadiene and butyl acrylate, said comonomer is acrylonitrile, and said hydroxyl-containing disulfide is 2-hydroxyethyl disulfide.

11. A process of claim 6 wherein said vinylidene monomers are butyl acrylate and ethyl acrylate, said comonomer is acrylonitrile, and said hydroxyl-containing disulfide is 2-hydroxyethyl disulfide.

12. A process of claim 6 wherein said vinylidene monomers are butyl acrylate, ethyl acrylate and 2-hydroxyethyl acrylate, said comonomer is acrylonitrile, and said hydroxyl-containing disulfide is 2-hydroxyethyl disulfide.

* * * * *